KENNEDY, HOLT & GERLACH.
Electric Clock.
No. 3,772. Reissued Dec. 21, 1869.
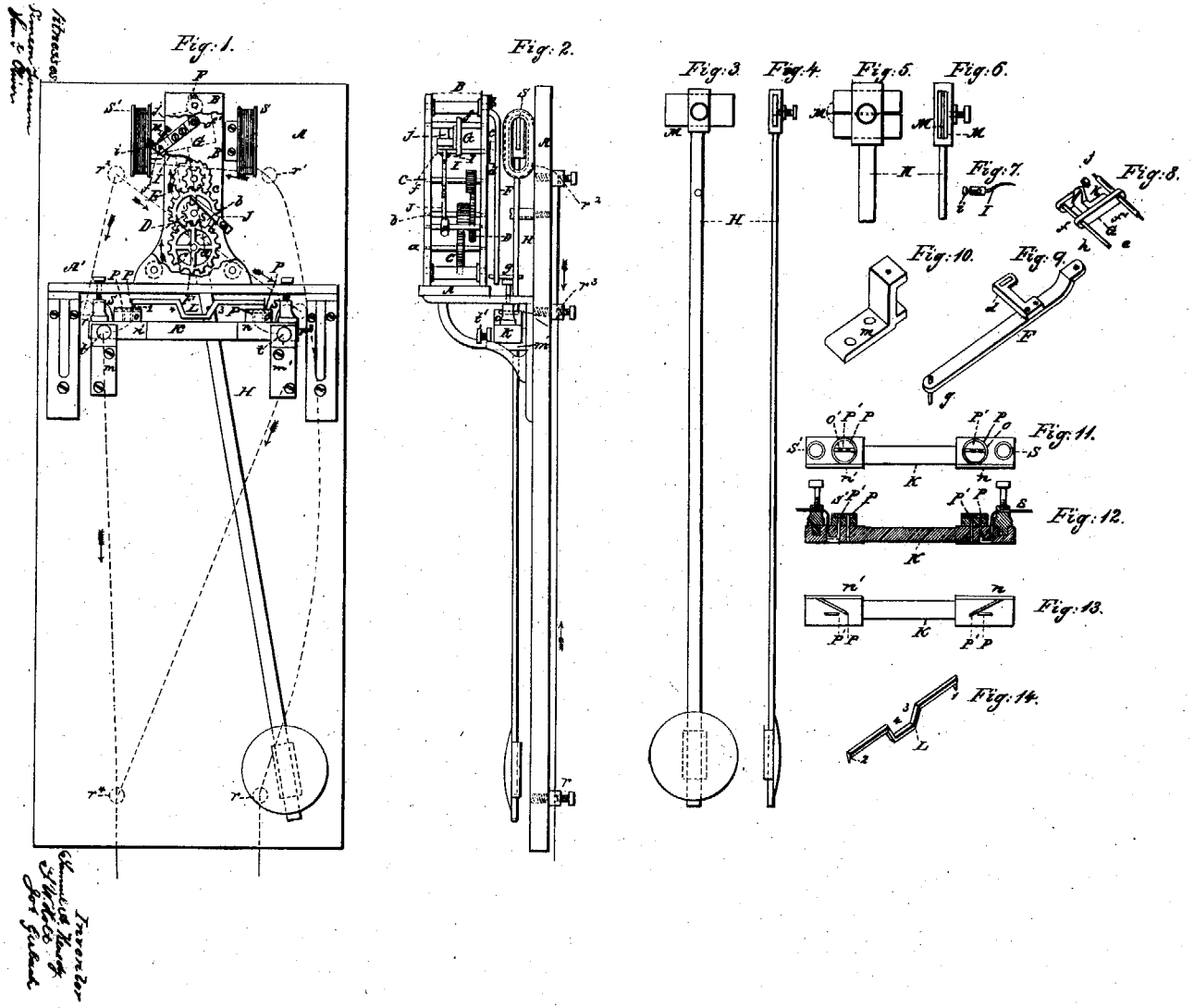
N. PETERS, Photo-Lithographer, Washington, D. C.

UNITED STATES PATENT OFFICE.

THE KENNEDY ELECTRIC CLOCK COMPANY, ASSIGNEE OF S. A. KENNEDY, S. W. HOLT, AND J. GERLACH, OF NEW YORK, N. Y.

IMPROVEMENT IN ELECTRIC CLOCKS.

Specification forming part of Letters Patent No. 71,624, dated December 3, 1867; Reissue No. 3,772, dated December 21, 1869.

*To all whom it may concern:*

Be it known that SAMUEL A. KENNEDY, of Attleborough, Bucks county, in the State of Pennsylvania, and S. W. HOLT and JOSEPH GERLACH, of the city and county of Philadelphia, and State of Pennsylvania, invented a new and useful Improvement in Electric Clocks; and we, THE KENNEDY ELECTRIC CLOCK COMPANY, of New York, in the county of New York and State of New York, by our president and secretary, do hereby declare that the following is a full and exact description thereof, reference being had to the accompanying drawings, and to the letters of reference marked thereon.

The nature of the invention mainly consists in forming and breaking the connection with the positive and negative poles of a battery by means of a sliding bar operated by the pendulum, and arranged and operating as hereinafter described.

In the accompanying drawings, which make a part of this specification, Figure 1 is a front elevation of the improved clock. Fig. 2 is an edge view of the same. Fig. 3 is a front view of the pendulum H and magnet M in connection. Fig. 4 is an edge view of the same. Fig. 5 is a front view of a modification of the said bar and pendulum. Fig. 6 is an edge view of the same. Fig. 7 is a vertical section of the pawl I. Fig. 8 is an isometrical view of the forked bar G and parts in connection therewith. Fig. 9 is a like view of the lever F. Fig. 10 is a like view of one of the brackets *m*. Fig. 11 is a top view of the bridge K. Fig. 12 is a vertical section of the same. Fig. 13 is a bottom view of the said bridge. Fig. 14 is an isometrical view of the bar L.

A is a board to which the several parts of the clock are attached.

A′ is a shelf which supports the vertical plates B B that support the journals of the shafts *a b c* of the center wheel, C, the second wheel, D, and the ratchet-wheel E.

F is a vertical lever, which is actuated by the pendulum H, for giving an automatic motion to the ratchet-wheel E, there being a slotted arm, *d*, of the lever, which receives the pin *e* of the forked bar G, in which the pawl, I, is hung by means of the horizontal rod *f′*. The upper end of the said bar G is permanently confined to the rock-shaft *f′*. At each vibration of the pendulum from right to left the pawl is drawn outward from the ratchet-wheel by the pendulum bearing against the pin *g* of said lever F, and when the pendulum swings back to the right the weight of the lever and forked bar forces the pawl forward until the arm *h* of said bar bears against the edge of the contiguous vertical plate B.

The resistance of the clock-work is not always constant, and accuracy is not obtained if the pendulum meets with variable resistance; hence, instead of driving the pawl I and the ratchet-wheel E by the direct force of the pendulum, a constant weight, as the lever F, is employed for this purpose, whereby the work required of and the resistance to the pendulum in lifting lever F or any uniform weight is always constant.

There is a set-screw *j* in the lug *k* of the forked bar G, by which the heel end of the pawl is borne down more or less to give a longer or shorter catch of the pawl to regulate the motion of the ratchet-wheel, and there is a set-screw, *l*, in the heel of the pawl for equalizing the balance of the same, so as to prevent its falling too hard upon the ratchet.

J is the click-lever.

K is an adjustable bridge supported by the brackets *m* and *m′*. The bridge is provided with plates, *n* and *n′*, that communicate with the magnetic wires, there being insulated projections *o o′*, which have wires *p p′* and *p p′* connected with the main-circuit wires.

L is a bar to break the circuit, it having points 1 2, which communicate alternately at each motion of the pendulum with the wires *p* and *p′* in the projections *o* and *o′*, the pin *g* of the pendulum, bearing alternately against the vertical parts 3 and 4 of the bar, and thus changing the points 1 and 2 with the wires *p p′* and *p p′*, so as to change the current. The points 1 and 2 of the bar L, and the upper ends of the circuit wires *p p′* in the projections *o o′* of the bridge K, are of gold. The said projections *o* and *o′* have grooved facings, as seen in Figs. 11 and 12, to guide the points 1 and 2 of the bar L. The former facings are made of brass and the latter of agate.

The pendulum H is shown in detail in Figs. 3 and 4, Sheet No. 2; the forked bar G and parts attached in Fig. 8; the lever F in Fig.

9; one of the brackets *m* in Fig. 10; the bridge K in Figs. 11, 12, and 13, and the sliding bar L in Fig. 14.

The arm *h* and pin *e* may be an extension of the rod *f* in the forked bar G, as represented in Fig. 8.

The pendulum H has a magnetized bar, M, which is actuated to produce the vibration of the pendulum by the electric coils S and S′, that are in the drawing placed above the center of motion. They may, however, be placed below the centre when desired, as the same result would be produced. We contemplate using four or more coils when we want more power, and also having a plurality of the magnetized bars M in the pendulum H. In Figs. 5 and 9 four are represented, which are insulated on their bearings by means of a thin coating of of wax or otherwise.

The current, commencing with the platinum or positive pole of a battery, passes through the button *r*, and thence through the button *r′* to the coil S, and from that to S′, as indicated by the arrows, and through the button $r^2$, and thence through the button $r^3$, and through the stud *s* on the bridge K; thence through the projection *o* to point *p*. The current passes from thence through the screw *t*, which communicates with the bracket *m*, to which is connected the wire leading to the negative pole of the battery; thence through the button $r^4$.

The circuit is closed when the pendulum is swung to the right, as represented in the drawings; but when it is swung to the left it moves the sliding bar L so as to bring the points 1 and 2 into connection with the points *p′ p′* of the projections *o* and *o′*, thus changing the current as it passes from $r^2$ to $r^5$; thence through the stud *s′*, and thence to the point *p′* in the projection *o′* on the bridge K to the sliding bar L at the point 2, and passes through said bar to its point 1, where it communicates with the wire *p* in the projection *o*; thence to screw *l′* in the bracket *m′* to the wire leading to the negative pole of the battery through button $t^4$. When the pendulum comes into the position as it now stands the magnet M enters the coil S′, and being repelled by the same the motion of the pendulum is changed from right to left, and when it reaches the coil S the sliding bar L closes the circuit through the said coil, and the pendulum is again repelled back to the right, and thus the movement is continuously kept up.

The coils S and S′ must be so connected in the circuit that each shall respectively present the same polarity as that of the nearest end of the magnet *m*.

Having thus described our invention, what we claim as new, and desire to secure by Letters Patent, is—

1. Vibrating a pendulum having a magnet attached thereto by means of two electric coils, arranged one at each end of the magnet, the said magnet and coils having their corresponding poles placed opposite to each other, as shown and described.

2. Actuating the driving-pawl of a clock mechanism by a weight moved from a state of rest to a certain distance and retracted by its own gravity.

3. Carrying the weighted pawl-driver intermittently to its point of limitation, and then leaving it to the action of gravity, by means of an oscillating pendulum, in the manner set forth.

NATHANIEL BERRY, *Prs't.*
O. H. SCHREINER, *Secretary.*

Witnesses:
GEO. M. HARD,
C. H. VALENTINE.